(12) United States Patent
Martin

(10) Patent No.: US 11,518,315 B1
(45) Date of Patent: Dec. 6, 2022

(54) CANE-HOLDING CLIP

(71) Applicant: Cecil Martin, Blacksburg, SC (US)

(72) Inventor: Cecil Martin, Blacksburg, SC (US)

(*) Notice: Subject to any disclaimer, the term of this patent is extended or adjusted under 35 U.S.C. 154(b) by 0 days.

(21) Appl. No.: 17/335,191

(22) Filed: Jun. 1, 2021

(51) Int. Cl.
*B60R 7/08* (2006.01)
*B60R 7/04* (2006.01)

(52) U.S. Cl.
CPC ............... *B60R 7/08* (2013.01); *B60R 7/046* (2013.01)

(58) Field of Classification Search
CPC .... B60R 7/08; B60R 7/12; B60R 7/14; B60R 7/046; A45B 1/04; A45B 2009/002
See application file for complete search history.

(56) References Cited

U.S. PATENT DOCUMENTS

| | | | |
|---|---|---|---|
| 2,919,058 A * | 12/1959 | Thompson | B60R 7/14 224/570 |
| 3,252,637 A * | 5/1966 | Hart | B60R 7/14 224/558 |
| 3,357,065 A * | 12/1967 | Anketell | B60R 7/14 224/570 |
| 4,300,742 A * | 11/1981 | Hunn | A47G 25/12 248/316.1 |
| 4,883,290 A * | 11/1989 | Landa | A45F 5/021 24/336 |
| 4,895,330 A | 1/1990 | Anstead | |
| 4,903,929 A * | 2/1990 | Hoffman | B25B 5/101 248/229.15 |
| 5,106,046 A | 4/1992 | Rowles | |
| 5,456,437 A * | 10/1995 | Chander | A45B 1/04 211/62 |
| 5,462,212 A * | 10/1995 | Hertel, Jr. | B60N 3/14 224/570 |
| 5,878,837 A * | 3/1999 | Kistner | B66F 11/04 182/129 |
| 6,145,719 A * | 11/2000 | Robert | B60R 7/14 224/435 |
| 6,565,053 B1 * | 5/2003 | Larky | A61G 5/10 248/229.11 |
| 6,651,946 B1 * | 11/2003 | Thornton | A61G 5/10 297/188.21 |
| 7,178,777 B1 * | 2/2007 | Banker | B25H 3/006 248/316.7 |
| D547,048 S * | 7/2007 | Conway | D3/10 |
| D680,857 S * | 4/2013 | Rumpel | D8/395 |
| D738,099 S * | 9/2015 | Mosteller | D3/10 |
| D787,173 S * | 5/2017 | Parnell | A61H 3/0244 D3/10 |
| 9,961,973 B2 | 5/2018 | Kaplan | |

(Continued)

FOREIGN PATENT DOCUMENTS

CA 2002556 9/1990
CZ 2020244 A3 * 11/2021

(Continued)

*Primary Examiner* — Justin M Larson
(74) *Attorney, Agent, or Firm* — Kyle A. Fletcher, Esq.

(57) ABSTRACT

The cane holding clip is a storage device. The cane holding clip comprises a terry clip structure, a door clamp structure, a vehicle, and a walking stick. The door clamp secures the terry clip structure to the vehicle. The terry clip structure secures the walking stick to the vehicle. The walking stick is a mobility assistance device. The cane holding clip secures the walking stick to a fixed position within the vehicle when the walking stick is not in use.

15 Claims, 5 Drawing Sheets

(56) References Cited

U.S. PATENT DOCUMENTS

| | | | |
|---|---|---|---|
| D830,149 S | 10/2018 | Pippus | |
| D831,329 S * | 10/2018 | Barahona | D3/10 |
| D877,485 S | 3/2020 | Rampersaud | |
| D898,340 S * | 10/2020 | Cindrich | D3/7 |
| 2003/0042282 A1* | 3/2003 | Gates | B60R 7/14 |
| | | | 224/558 |
| 2003/0042283 A1* | 3/2003 | Carnevali | B60R 7/14 |
| | | | 224/560 |
| 2003/0168484 A1* | 9/2003 | Gates | A47G 23/0225 |
| | | | 224/558 |
| 2003/0201634 A1* | 10/2003 | Kramer | B62J 11/05 |
| | | | 280/762 |
| 2005/0098695 A1* | 5/2005 | Hollenbeck | A61H 3/0244 |
| | | | 248/229.26 |
| 2008/0083798 A1 | 4/2008 | Broadwell | |
| 2012/0234885 A1* | 9/2012 | Hall | B60R 11/00 |
| | | | 224/567 |
| 2016/0297369 A1* | 10/2016 | Strakelijahn | B60R 7/12 |
| 2017/0332771 A1 | 11/2017 | Tandeski | |

FOREIGN PATENT DOCUMENTS

| | | | | |
|---|---|---|---|---|
| DE | 29703661 U1 * | 4/1997 | | A45B 11/00 |
| DE | 20018306 U1 * | 6/2001 | | A45B 1/04 |
| DE | 20018308 U1 * | 6/2001 | | A45B 1/04 |
| DE | 20103522 U1 * | 9/2001 | | B60R 7/12 |
| DE | 10246045 A1 * | 4/2004 | | B60R 13/0243 |
| GB | 2082990 A * | 3/1982 | | A47G 25/12 |
| GB | 2363980 A * | 1/2002 | | A45B 1/04 |
| GB | 2463072 A * | 3/2010 | | B60R 7/10 |

* cited by examiner

CANE-HOLDING CLIP

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of walking sticks with means for hanging the walking stick. (A45B1/04)

SUMMARY OF INVENTION

The cane holding clip is a storage device. The cane holding clip comprises a terry clip structure, a door clamp structure, a vehicle, and a walking stick. The door clamp secures the terry clip structure to the vehicle. The terry clip structure secures the walking stick to the vehicle. The walking stick is a mobility assistance device. The cane holding clip secures the walking stick to a fixed position within the vehicle when the walking stick is not in use.

These together with additional objects, features and advantages of the cane holding clip will be readily apparent to those of ordinary skill in the art upon reading the following detailed description of the presently preferred, but nonetheless illustrative, embodiments when taken in conjunction with the accompanying drawings.

In this respect, before explaining the current embodiments of the cane holding clip in detail, it is to be understood that the cane holding clip is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the cane holding clip.

It is therefore important that the claims be regarded as including such equivalent construction insofar as they do not depart from the spirit and scope of the cane holding clip. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
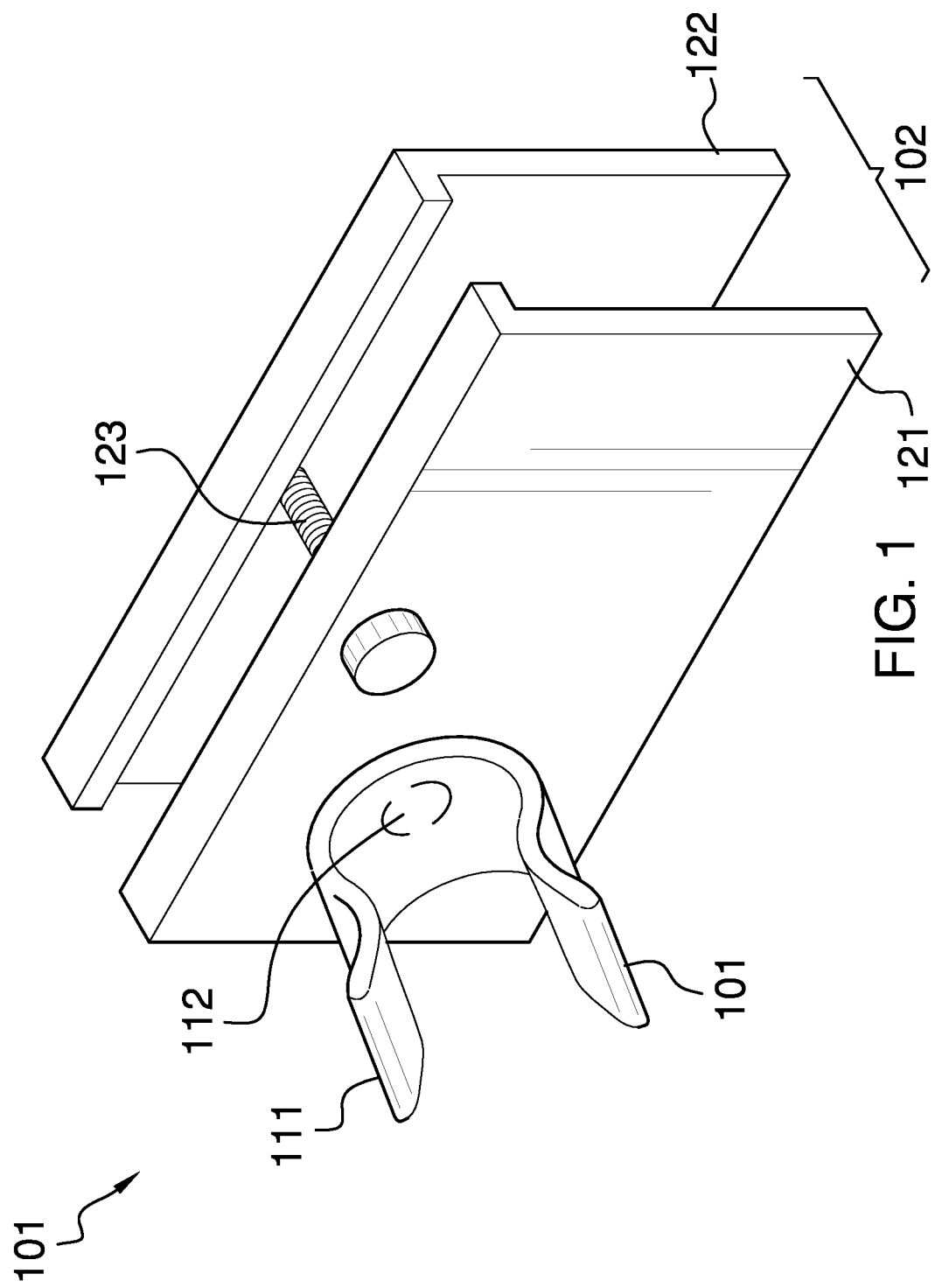
FIG. 1 is a perspective view of an embodiment of the disclosure.
Figure 2:
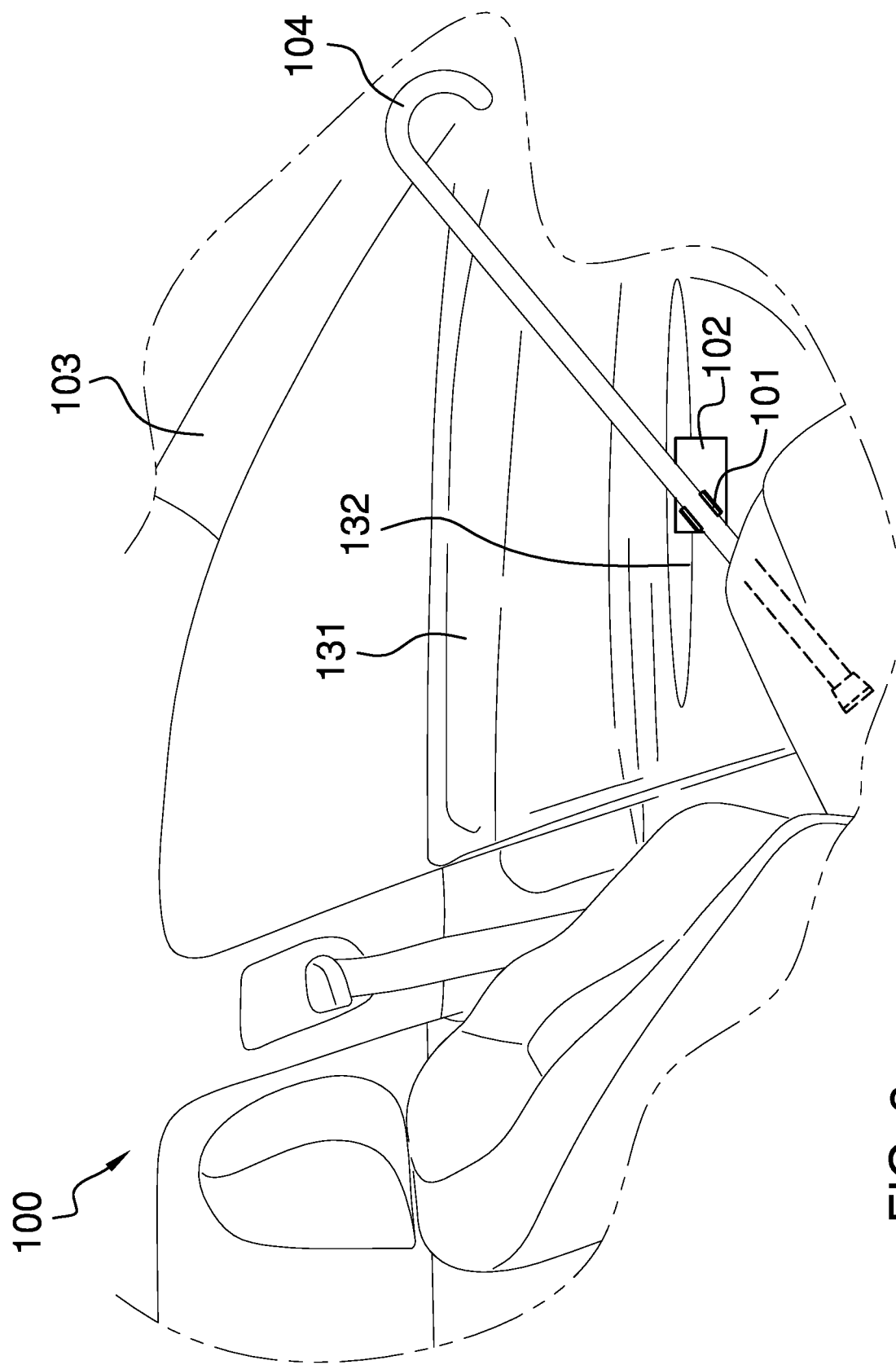
FIG. 2 is an in-use view of an embodiment of the disclosure.
Figure 3:
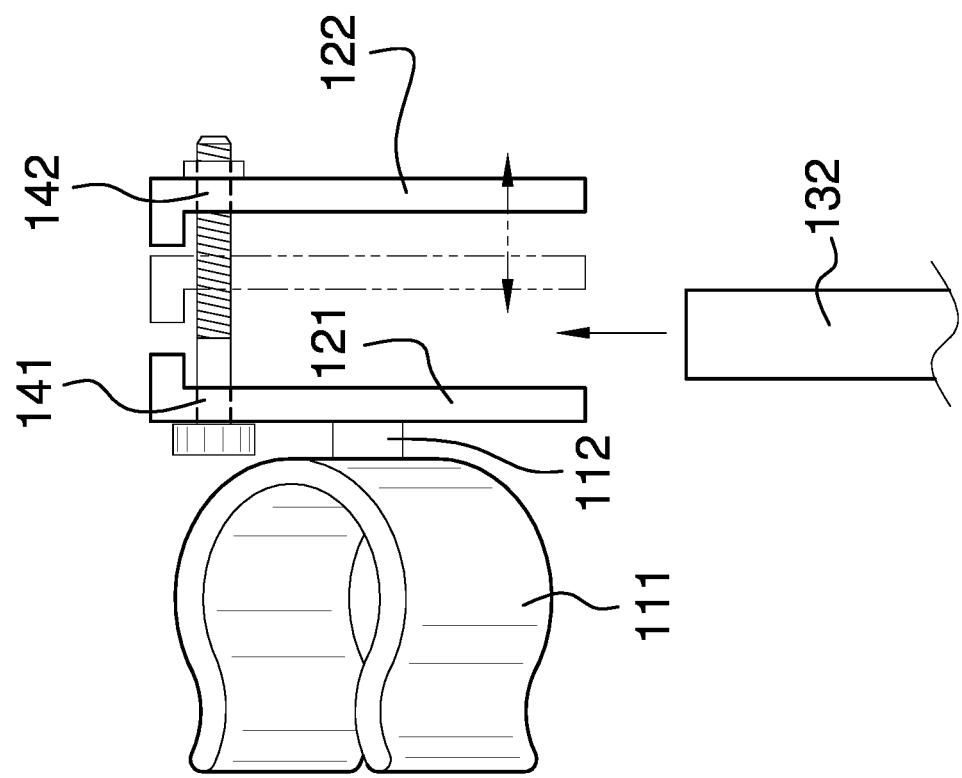
FIG. 3 is a side view of an embodiment of the disclosure.
Figure 4:
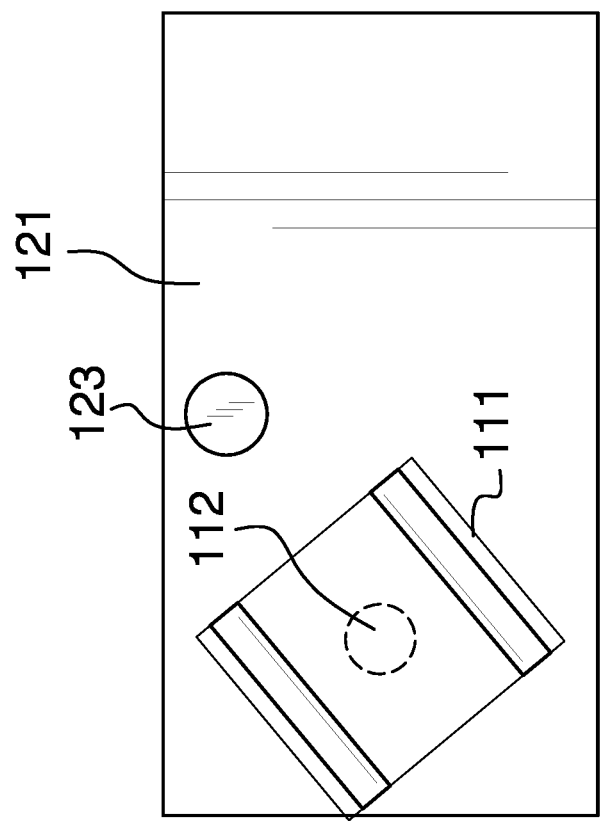
FIG. 4 is a front view of an embodiment of the disclosure.
Figure 5:
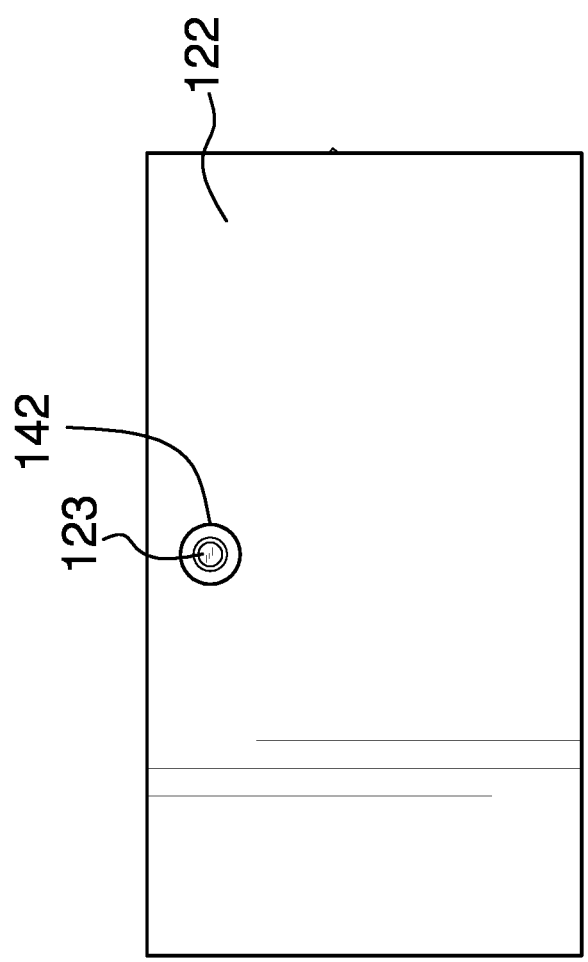
FIG. 5 is a rear view of an embodiment of the disclosure.

Detailed reference will now be made to one or more potential embodiments of the disclosure, which are illustrated in FIGS. 1 through 5.

The cane holding clip 100 (hereinafter invention) is a storage device. The invention 100 comprises a terry clip structure 101, a door 131 clamp structure 102, a vehicle 103, and a walking stick 104. The door 131 clamp secures the terry clip structure 101 to the vehicle 103. The terry clip structure 101 secures the walking stick 104 to the vehicle 103. The walking stick 104 is a mobility assistance device. The invention 100 secures the walking stick 104 to a fixed position within the vehicle 103 when the walking stick 104 is not in use.

The walking stick 104 is a mobility assistance device. The walking stick 104 is a prism-shaped structure. The walking stick 104 is a rigid structure. The walking stick 104 is a load bearing structure. The walking stick 104 forms a stanchion that transfers a load to a supporting surface. The load is transferred along a load path that is parallel to the center axis of the prism structure of the walking stick 104. The walking stick 104 is used by a patient to transfer the load (weight) of the patient to a supporting surface. The walking stick 104 inserts into the terry clip structure 101 for storage.

The vehicle 103 is a device used to transport passengers over a road network. The vehicle 103 is defined elsewhere in this disclosure. The vehicle 103 further comprises a door 131.

The door 131 is a rotating structure that controls access into the passenger compartment of the vehicle 103. The door 131 is defined elsewhere in this disclosure. The door 131 further comprises an anchor point 132. The anchor point 132 is a disk-shaped structure that is formed on the interior surface of the door 131. The anchor point 132 is located at a fixed position on the door 131. The anchor point 132 forms a mechanical structure used to anchor the door 131 clamp structure 102 to the door 131 of the vehicle 103.

The terry clip structure 101 is a mechanical structure. The terry clip structure 101 permanently attaches to the door 131 clamp structure 102. The walking stick 104 removably attaches to the terry clip structure 101. The terry clip structure 101 attaches to the door 131 clamp structure 102 such that the door 131 clamp structure 102 attaches the walking stick 104 to the vehicle 103. The terry clip structure 101 is a spring loaded structure. The terry clip structure 101 is a rotating structure. The terry clip structure 101 rotates relative to the door 131 clamp structure 102. The rotation of the terry clip structure 101 allows for the repositioning of the walking stick 104 within the vehicle 103. The terry clip structure 101 comprises a c-clip 111 and a rotating mount 112.

The c-clip 111 is a mechanical structure. The c-clip 111 is a spring loaded structure. The c-clip 111 forms a cantilever V spring structure. The c-clip 111 has a c shape. The c-clip 111 forms a disk-shaped negative space such that the walking stick 104 inserts into the c-clip 111 for storage. The center axis of the disk-shaped negative space formed by the c-clip 111 runs parallel to the center axis of the prism structure of the walking stick 104 when the walking stick 104 inserts into the c-clip 111. The c-clip 111 is defined elsewhere in this disclosure. The c-clip 111 attaches to the door 131 clamp structure 102 such that the c-clip 111 rotates relative to the door 131 clamp structure 102.

The c-clip 111 acts as a spring. Specifically, when a walking stick 104 inserts into the hollow interior of the c-clip 111 the lateral face of the prism-shaped structure of the c-clip 111 deforms such in a direction such that the inner diameter of the prism structure of the c-clip 111 increases. The deformation of the lateral face of the prism-shaped structure of the c-clip 111 applies a counter force that attempts to return c-clip 111 to its original positions. When the walking stick 104 inserts into the c-clip 111, the c-clip 111 applies a pressure against the walking stick 104 that effectively attaches the c-clip 111 to the walking stick 104.

The rotating mount 112 is a mount that attaches the c-clip 111 to the door 131 clamp structure 102. The mount is defined elsewhere in this disclosure. The rotating mount 112 is a rotating structure. The rotating mount 112 rotates such that the walking stick 104 rotates relative to the vehicle 103.

The door 131 clamp structure 102 is a mechanical structure. The door 131 clamp structure 102 is an anchor that attaches the terry clip structure 101 to the vehicle 103. Specifically, the door 131 clamp structure 102 attaches to an anchor point 132 found on the door 131 of the vehicle 103. The door 131 clamp structure 102 removably attaches to the anchor point 132. The door 131 clamp structure 102 comprises a first angle plate 121, a second angle plate 122, and a securing bolt 123.

The securing bolt 123 is a bolt. The bolt is defined elsewhere in this disclosure. The securing bolt 123 attaches the first angle plate 121 to the second angle plate 122 such that the span of the distance between the faces of the first angle plate 121 and the second angle plate 122 are adjustable. The securing bolt 123 provides the pressure that secures the door 131 clamp structure 102 to the anchor point 132 of the door 131 of the vehicle 103.

To attach the door 131 clamp structure 102 to the door 131 of the vehicle 103, the anchor point 132 inserts between the first angle plate 121 and the second angle plate 122 after the securing bolt 123 has secured the first angle plate 121 to the second angle plate 122. The securing bolt 123 is then adjusted to bring the second angle plate 122 and the first angle plate 121 together such that the second angle plate 122 and the first angle plate 121 apply a pressure to the faces of the disk structure of the anchor point 132 that secures the door 131 clamp structure 102 to the anchor point 132.

The first angle plate 121 is an angle plate. The angle plate is defined elsewhere in this disclosure. The first angle plate 121 forms a portion of the clamping structure of the door 131 clamp structure 102. The first angle plate 121 is placed against the anchor point 132 of the door 131 of the vehicle 103 such that the first angle plate 121 applies a pressure against the anchor point 132 when the door 131 clamp structure 102 is secured to the anchor point 132. The brink formed in the first angle plate 121 faces the second angle plate 122 such that a minimum span of distance between the first angle plate 121 and the second angle plate 122 is formed. The minimum span of distance between the first angle plate 121 and the second angle plate 122 protects the anchor point 132 from damage.

The rotating mount 112 of the terry clip structure 101 attaches the c-clip 111 to the face of the first angle plate 121 with the greatest surface area. The rotating mount 112 mounts on the surface of the first angle plate 121 that is distal from the second angle plate 122.

The first angle plate 121 further comprises a first nut 141. The first nut 141 is a nut that is formed: a) from the surface of the first angle plate 121 with the greatest surface area; to, b) the surface of the first angle plate 121 with the second greatest surface area. The first nut 141 is sized to receive the securing bolt 123 such that the securing bolt 123 screws into and through the first angle plate 121 by screwing through the first nut 141.

The second angle plate 122 is an angle plate. The angle plate is defined elsewhere in this disclosure. The second angle plate 122 forms a portion of the clamping structure of the door 131 clamp structure 102. The second angle plate 122 is placed against the anchor point 132 of the door 131 of the vehicle 103 such that the second angle plate 122 applies a pressure against the anchor point 132 when the door 131 clamp structure 102 is secured to the anchor point 132. The brink formed in the second angle plate 122 faces the first angle plate 121 such that a minimum span of distance between the second angle plate 122 and the first angle plate 121 is formed. The minimum span of distance between the second angle plate 122 and the first angle plate 121 protects the anchor point 132 from damage. The second angle plate 122 further comprises a second nut 142. The second nut 142 is a nut that is formed: a) from the surface of the second angle plate 122 with the greatest surface area; to, b) the surface of the second angle plate 122 with the second greatest surface area. The second nut 142 is sized to receive the securing bolt 123 such that the securing bolt 123 screws into and through the second angle plate 122 by screwing through the second nut 142. The securing bolt 123 secures the first angle plate 121 to the second angle plate 122 by simultaneously screwing through the first nut 141 and the second nut 142.

The nut is defined elsewhere in this disclosure.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Angle Plate and Bent Plate: As used in this disclosure, an angle plate is a rectangular plate that is bent to form a right angle such that the brink formed by the right angle runs parallel to the major axis of the rectangular plate. When formed from metal, an angle plate is often referred to as an angle iron. A bent plate is a rectangular plate that is bent to form a right angle such that the brink formed by the right angle runs parallel to the minor axis of the rectangular plate. When formed from metal, an angle plate is often referred to as an angle iron. Bolt: As used in this disclosure, a bolt is a cylindrical shaft that is formed with an exterior screw thread. A bolt is defined with an outer diameter.

Brink: As used in this disclosure, a brink refers to the edge or line formed by the intersection of a first plane or surface and a second plane or surface wherein a cant exists between the first plane or surface and the second plane or surface.

C-Clip: As used in this disclosure, a C-clip is a fastening device that is formed in the shape of a hollow prismatic bifurcation. The congruent ends of the base prism shape that forms the C-clip form a C shape or a U shape. The lateral face of the base prism shape that forms the C-clip is formed as an elastic structure. When an object is inserted into the hollow interior of the C-clip, a force is applied to the lateral face of the C-clip such that the C-clip the force elastically deforms in a direction that increases the inner diameter of the C-clip.: The C-clip resists the application of the force by attempting to return to its relaxed shape. The C-clip stores the energy deformation such that when the force is no longer applied to the cantilever V spring returns to its relaxed shape. This stored energy applies a pressure to the object that secures the object in position within the C-clip. The C-clip is also referred to as a circlip or a snap ring. An illiterate C-Clip structure refers to a C-Clip structure where: a) the arms of the U-shaped structure of the C-Clip are not of equal distances; or b) the crossbeam of the U-shaped structure of the C-Clip is selected from the group consisting of a non-Euclidean structure, a curved structure, or a bent structure.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Cantilever V Spring: As used in this disclosure, a cantilever V spring is a torsion spring that is formed in a chevron, hyoid, or horseshoe shape. The cantilever V spring comprises a first cantilever structure and a second cantilever structure wherein the fixed end of the first cantilever structure is attached to the fixed end of the second cantilever structure. Within this structure, when a force is applied to the cantilever V spring such that the first cantilever structure moves relative to from the second cantilever structure the force deforms the cantilever V spring in an elastic manner that: 1) resists the application of the force; and 2) stores the energy deformation such that when the force is no longer applied the cantilever V spring returns to its relaxed shape. Depending on the application, a cantilever V spring can be considered a torsion spring, a tension spring, or a compression spring. The term offset cantilever V spring means that the span of the length of the first cantilever structure differs from the span of the length of the second cantilever structure.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chevron: As used in this disclosure, chevron is a term that is used to describe an object that has the shape of a U or a V.

Clamp: As used in this disclosure, a clamp refers to a structure that temporarily fastens to the one or more faces of one or more prism structures. The clamp is used: a) to attach an externally provisioned object to the lateral face of a prism structure; or, b) to press a first face of a first prism to a second face of a second prism.

Clip: As used in this disclosure, a clip is a fastener that attaches to an object by gripping or clasping the object. A clip is typically spring loaded.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Door: As used in this disclosure, a door is a movable or removable barrier that is attached to a chamber for the purpose of allowing or preventing access through an aperture into the chamber.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Exterior Screw Thread: An exterior screw thread is a ridge wrapped around the outer surface of a tube in the form of a helical structure that is used to convert rotational movement into linear movement.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Helix: As used in this disclosure, a helix is the three-dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Interior Screw Thread: An interior screw thread is a groove that is formed around the inner surface of a tube in the form of a helical structure that is used to convert rotational movement into linear movement.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Major and Minor Axes: As used in this disclosure, the major and minor axes refer to a pair of perpendicular axes that are defined within a structure. The length of the major axis is always greater than or equal to the length of the minor axis. The major axis is always the longest diameter of the structure. The major and minor axes intersect at the center of the structure. The major axis is always parallel to the longest edge of a rectangular structure.

Mobility Assistance Device: As used in this disclosure, a mobility assistance device is a mechanical device used to help patients with limited mobility to move.

Mount: As used in this disclosure, a mount is a mechanical structure that attaches or incorporates an object into a load path.

Negative Space: As used in this disclosure, negative space is a method of defining an object through the use of open or empty space as the definition of the object itself, or, through the use of open or empty space to describe the boundaries of an object.

Nut: As used in this disclosure, a nut is a first object that is formed with a cylindrical negative space that further comprises an interior screw thread such that a second object with a matching exterior screw thread can screwed into the first object forming a threaded connection. A nut is further defined with an inner diameter.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

Patient: As used in this disclosure, a patient is a person who is designated to receive a medical treatment, therapy or service. The term patient may be extended to an animal when used within the context of the animal receiving veterinary treatment or services.

Perimeter: As used in this disclosure, a perimeter is one or more curved or straight lines that bounds an enclosed area on a plane or surface. The perimeter of a circle is commonly referred to as a circumference.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Relaxed Shape: As used in this disclosure, a structure is considered to be in its relaxed state when no shear, strain, or torsional forces are being applied to the structure.

Rotation: As used in this disclosure, rotation refers to the cyclic movement of an object around a fixed point or fixed axis. The verb of rotation is to rotate.

Screw: As used in this disclosure, to screw is a verb meaning: 1) to fasten or unfasten (unscrew) a threaded connection; or 2) to attach a helical structure to a solid structure.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Terry Clip: As used in this disclosure, a terry clip is a hyoid shaped version of a cantilever V spring that is commonly used to attach the handle of a tool to a vertical surface.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Torsion Spring: As used in this disclosure, a torsion spring is a mechanical device that stores mechanical energy through an opposing torque when the mechanical device is bent or twisted. The torsion spring will return to its original relaxed shape when the twisting force is removed.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Walking Stick: As used in this disclosure, a walking stick is a mobility assistance device. The walking stick is a rigid prism-shaped structure that is used by a patient. The walking stick is used as a stanchion that transfers a portion of the load (weight) of the patient to a supporting surface. A cane is a synonym for a walking stick.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A cane holding clip comprising
a terry clip structure, a door clamp structure, a vehicle, and a walking stick;
wherein the door clamp secures the terry clip structure to the vehicle;
wherein the terry clip structure secures the walking stick to the vehicle;
wherein the cane holding clip is a storage device;
wherein the walking stick is a mobility assistance device;
wherein the cane holding clip secures the walking stick to a fixed position within the vehicle;
wherein the walking stick is a rigid structure;
wherein the walking stick is a load bearing structure;
wherein the walking stick forms a stanchion that transfers a load to a supporting surface;
wherein the load is transferred along a load path that is parallel to the center axis of the walking stick;
wherein the walking stick inserts into the terry clip structure;
wherein the vehicle further comprises a door;
wherein the door further comprises an anchor point;
wherein the anchor point is a disk-shaped structure that is formed on the interior surface of the door;
wherein the anchor point is located at a fixed position on the door;
wherein the anchor point forms a mechanical structure used to anchor the door clamp structure to the door of the vehicle.

2. The cane holding clip according to claim 1
wherein the terry clip structure is a mechanical structure;
wherein the terry clip structure permanently attaches to the door clamp structure;

wherein the walking stick removably attaches to the terry clip structure;

wherein the terry clip structure attaches to the door clamp structure such that the door clamp structure attaches the walking stick to the vehicle.

3. The cane holding clip according to claim 2 wherein the terry clip structure is a spring loaded structure;

wherein the terry clip structure is a rotating structure;

wherein the terry clip structure rotates relative to the door clamp structure;

wherein the rotation of the terry clip structure allows for the repositioning of the walking stick within the vehicle.

4. The cane holding clip according to claim 3 wherein the door clamp structure is a mechanical structure;

wherein the door clamp structure is an anchor that attaches the terry clip structure to the vehicle;

wherein the door clamp structure removably attaches to the anchor point.

5. The cane holding clip according to claim 4 wherein the terry clip structure comprises a c-clip and a rotating mount;

wherein the rotating mount is a mount that attaches the c-clip to the door clamp structure.

6. The cane holding clip according to claim 5 wherein the door clamp structure comprises a first angle plate, a second angle plate, and a securing bolt;

wherein the securing bolt attaches the first angle plate to the second angle plate such that the span of the distance between the faces of the first angle plate and the second angle plate are adjustable.

7. The cane holding clip according to claim 6 wherein the c-clip is a mechanical structure;

wherein the c-clip is a spring loaded structure;

wherein the c-clip forms a cantilever v spring structure;

wherein the c-clip has a c shape.

8. The cane holding clip according to claim 7 wherein the c-clip forms a disk-shaped negative space such that the walking stick inserts into the c-clip for storage;

wherein the center axis of the disk-shaped negative space formed by the c-clip runs parallel to the center axis of the walking stick when the walking stick inserts into the c-clip.

9. The cane holding clip according to claim 8 wherein the rotating mount is a rotating structure;

wherein the rotating mount rotates such that the walking stick rotates relative to the vehicle.

10. The cane holding clip according to claim 8 wherein the securing bolt is a bolt;

wherein the securing bolt provides the pressure that secures the door clamp structure to the anchor point of the door of the vehicle.

11. The cane holding clip according to claim 8 wherein the anchor point inserts between the first angle plate and the second angle plate after the securing bolt has secured the first angle plate to the second angle plate;

wherein the securing bolt adjusts to bring the second angle plate and the first angle plate together such that the second angle plate and the first angle plate apply a pressure to the faces of the disk structure of the anchor point that secures the door clamp structure to the anchor point.

12. The cane holding clip according to claim 11 wherein the first angle plate is an angle plate;

wherein the first angle plate forms a portion of the clamping structure of the door clamp structure;

wherein the first angle plate is placed against the anchor point of the door of the vehicle such that the first angle plate applies a pressure against the anchor point when the door clamp structure is secured to the anchor point;

wherein the brink formed in the first angle plate faces the second angle plate such that a minimum span of distance between the first angle plate and the second angle plate is formed.

13. The cane holding clip according to claim 12 wherein the rotating mount of the terry clip structure attaches the c-clip to the face of the first angle plate with the greatest surface area;

wherein the rotating mount mounts on the surface of the first angle plate that is distal from the second angle plate.

14. The cane holding clip according to claim 13 wherein the second angle plate is an angle plate;

wherein the second angle plate forms a portion of the clamping structure of the door clamp structure;

wherein the second angle plate is placed against the anchor point of the door of the vehicle such that the second angle plate applies a pressure against the anchor point when the door clamp structure is secured to the anchor point;

wherein the brink formed in the second angle plate faces the first angle plate such that a minimum span of distance between the second angle plate and the first angle plate is formed.

15. The cane holding clip according to claim 14 wherein the first angle plate further comprises a first nut;

wherein the first nut is a nut that is formed: a) from the surface of the first angle plate with the greatest surface area; to, b) the surface of the first angle plate with the second greatest surface area;

wherein the first nut is sized to receive the securing bolt such that the securing bolt screws into and through the first angle plate by screwing through the first nut;

wherein the second angle plate further comprises a second nut;

wherein the second nut is a nut that is formed: a) from the surface of the second angle plate with the greatest surface area; to, b) the surface of the second angle plate with the second greatest surface area;

wherein the second nut is sized to receive the securing bolt such that the securing bolt screws into and through the second angle plate by screwing through the second nut;

wherein the securing bolt secures the first angle plate to the second angle plate by simultaneously screwing through the first nut and the second nut.

\* \* \* \* \*